United States Patent [19]

Becker

[11] 4,137,980
[45] Feb. 6, 1979

[54] FAIL-SAFE MEASURING WEIGHT

[76] Inventor: Harry C. Becker, 190 Broadview Ave., New Rochelle, N.Y. 10804

[21] Appl. No.: 832,271

[22] Filed: Sep. 12, 1977

[51] Int. Cl.² .................................... G01G 1/18
[52] U.S. Cl. .................................... 177/264; 73/1 B
[58] Field of Search .......................... 177/264; 73/1 B

[56] References Cited

U.S. PATENT DOCUMENTS

| 1,094,895 | 4/1914 | Hazen | 177/264 |
|---|---|---|---|
| 1,726,931 | 9/1929 | Snelling | 177/264 |
| 1,878,009 | 9/1932 | Snelling | 177/264 |
| 3,997,015 | 12/1976 | Lamb | 177/264 |

Primary Examiner—George H. Miller, Jr.
Attorney, Agent, or Firm—Anthony J. Casella

[57] ABSTRACT

A fail-safe measuring weight comprises a body portion having a threaded bore therethrough, the threaded bore including a portion of reduced diameter. An adjustment plug for adjusting the weight to within a very fine tolerance of its final desired value includes a head portion and an exteriorly threaded stem portion, the stem portion being receivable in the reduced diameter portion of the body portion bore for securing the adjustment plug therein, and inhibiting inaccuracies of the weight due to improper use. Because the adjustment plug comprises 1% to 5% of the total weight of the instrument its absence may be readily ascertained. The fail-safe weight further comprises a cover member having a threaded bore for receiving adjustment particles which may be sealed therein. The cover member further includes a rod member, integral therewith and partially disposed therein transverse to the longitudinal axis of said cover member, portions of the rod member projecting from the sides of the cover member to form hand grips, whereby movement of the weight is facilitated.

6 Claims, 2 Drawing Figures

FAIL-SAFE MEASURING WEIGHT

BACKGROUND OF THE INVENTION

The subject invention relates to standard measuring weights which are typically used in conjunction with a balance for very accurately weighing quantities of matter. These weights are applicable in scientific or laboratory work, as well as in measuring the weight of retail goods sold to the public. As such, it can be appreciated that they are very delicate, precision instruments which must approximate their true value within a very fine tolerance.

Generally, known measuring weights include a body portion having a threaded bore, and a cap portion which is screwed into the bore of the body portion. Typically, adjustment particles are included in the bore of the weight and sealed therein by the cap. These particles, which may be as fine as dust particles, are added to the weight at the time of manufacture, and serve to bring the weight to within a very fine tolerance of its true value. After a period of use it may be necessary to add additional adjustment particles to the weight to keep it accurate. An example of such an instance is after polishing of the weight. More particularly, it is often desirable that a weight, after it has been used for a period of time, be polished. However, attendant with polishing is the loss of material and weight. Accordingly, in order to bring the weight to within an acceptable tolerance of its true weight additional adjustment particles must be added.

Several shortcomings have been associated with the known standard measuring weights described above. One shortcoming relates to improper use of the weight.

Ideally, the cap of the weight should never be removed except at appropriate times when adjustment of the weight is necessary, and then only by a technically qualified person. However, it has been often experienced that users, for one reason or another, remove the cap portion from the body of the weight, often causing part or all of the adjustment particles contained in the bore thereof to empty out. It should be appreciated that these adjustment particles may be very fine dust-like particles, which may be easily lost and practically impossible to replace by the user. Of course, if some of the adjustment particles are missing, the weight, which must necessarily be a precision instrument, is no longer accurate.

Another shortcoming of known measuring weights is directly related to the above described misuse. More particularly, although loss of all or part of the adjustment particles renders the weight inaccurate, the relatively small difference in weight would not be apparent to an indiscriminate subsequent user. As a result, an inaccurate weight, instead of a precision instrument will be in continuous use. The effect of such use especially in laboratory work and other applications requiring a high degree of precision can be readily appreciated.

A further shortcoming of known measuring weights relates to their cap or cover portions. More particularly, the cap or cover portions of known measuring weights are generally so configured as to enable a user to grip the weight with only one hand. It may be readily appreciated that as such, movement of weights weighing on the order of fifty to one hundred pounds can be quite cumbersome.

Accordingly, it is an object of the subject invention to provide a new and improved standard measuring weight in which inaccuracies caused by improper use is virtually eliminated.

It is another object of the subject invention to provide a new and improved measuring weight in which even if the weight has been tampered with, a subsequent user can readily ascertain that the weight is not at its proper value.

It is a further object of the subject invention to provide a new and improved measuring weight in which weights on the order of fifty to one hundred pounds may be more easily handled and moved.

SUMMARY OF THE INVENTION

In accordance with the subject invention a measuring weight comprises a body portion having a threaded bore extending from one end of the body to a point intermediate the opposite end thereof. The threaded bore preferably includes a portion of reduced diameter. The measuring weight of the subject invention further comprises a plug for adjusting the weight to within a very fine tolerance of its desired value, the adjustment plug being receivable in the threaded bore of the weight body. The adjustment plug is preferably on the order of 1% to 5% of the total weight of the measuring weight. Preferably, the adjustment plug is exteriorly threaded and provided with means for securely fastening the plug into the portion of reduced diameter in the threaded bore of the weight body. The fastening means may typically include holes in the plug for receiving a key, wrench or the like whereby the plug may be screwed into the portion of reduced diameter in the bore.

The measuring weight of the subject invention further comprises a cover member, having a cap portion and an exteriorly threaded stem portion, integral therewith, which is receivable in the threaded bore of the weight body. Preferably the stem portion of the cover member includes a threaded bore for receiving adjustment particles, which may be sealed within said cover member bore by means of a headless set screw or the like.

For measuring weights on the order of ten pounds or more it is preferable that the cover member includes means by which a person can grip the weight with two hands. This means may be a rod member partially disposed within the cap portion of the cover member to transverse the longitudinal axis of the cover member, portions of the rod member projecting from the sides of the cap portion to form hand grips.

The adjustment plug provides the weight of the subject invention with a fail-safe feature by which inaccuracies due to tampering are virtually eliminated or at the very least made readily apparent. The adjustment plug is a solid member which is securely fastened within the bore of the weight body. If the plug is removed from the body it may be easily reinserted without rendering the weight inaccurate, the plug being a solid member as opposed to fine dustlike particles. In addition, should the plug be removed and not reinserted, its absence may be readily ascertained in that it comprises on the order of 1% to 5% of the total weight of the instrument.

DESCRIPTION OF THE PREFERRED EMBODIMENTS

Figure 1:
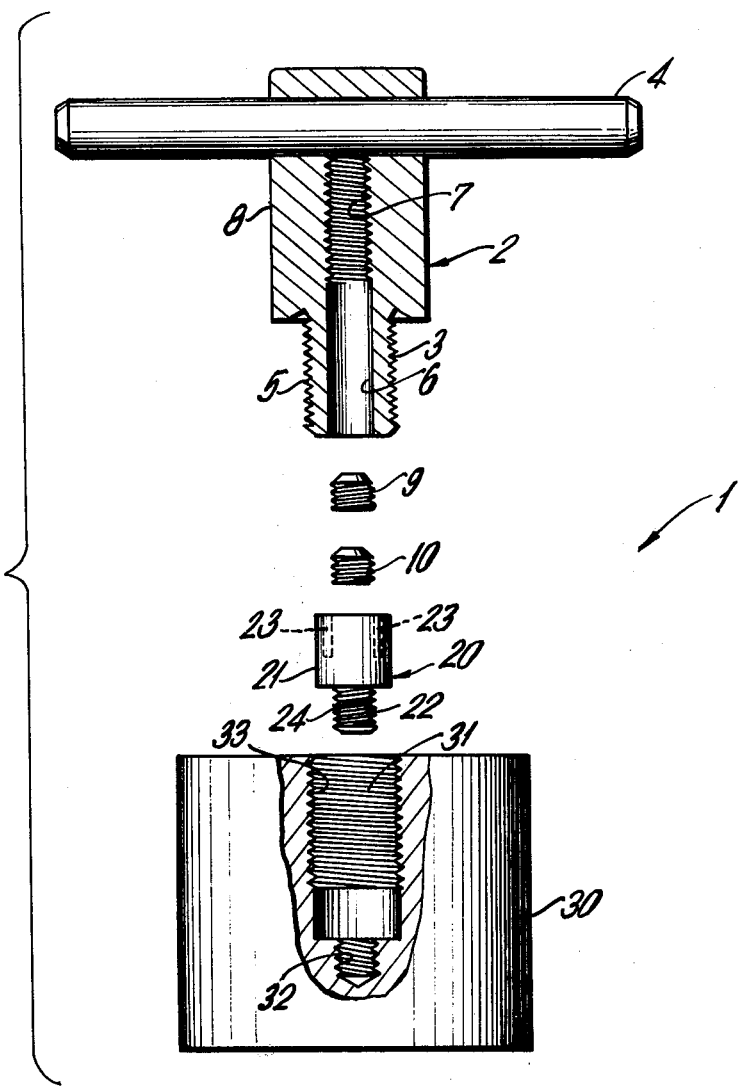
FIG. 1 is an exploded elevational view of the measuring weight of the subject invention.

Referring to FIG. 1, which is an exploded view of the components of the subject invention, there is illustrated a measuring weight 1 comprising a body portion 30, an adjustment plug 20, and a cover member 2. The body portion 30 has a bore 31 which is interiorly threaded with threads 33. Bore 31 preferably includes a portion 32 of reduced diameter for receiving adjustment plug 20.

Adjustment plug 20 is used to adjust measuring weight 1 to within a very fine tolerance of its desired value, and as will be described below, in effect, serves as a fail-safe feature. The adjustment plug 20 is receivable in bore 31.

Figure 2:
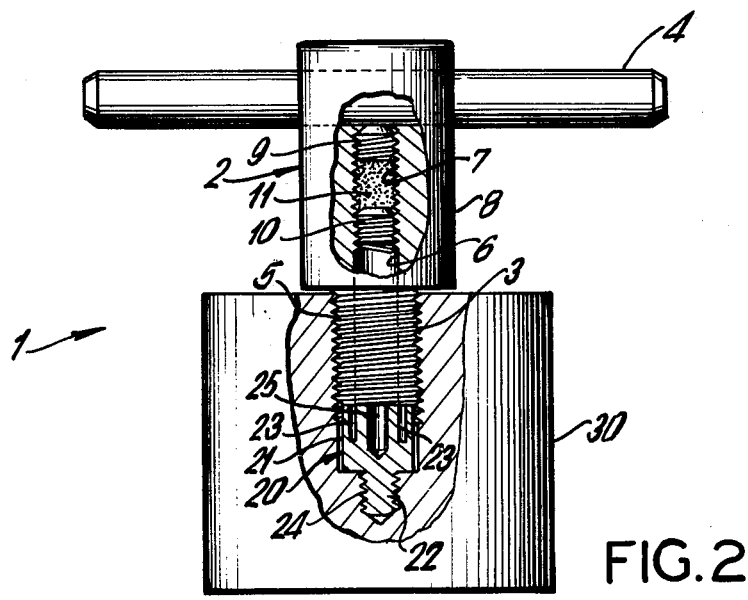
FIG. 2 is an elevational cross-section illustrating the measuring weight of the subject invention in its assembled, fully adjusted form.

As is illustrated in FIGS. 1 and 2, plug 20 includes a head portion 21 and a stem portion 22 which is exteriorly threaded with threads 24. Head portion 21 includes means for screwing stem portion 23 into the portion 32 of reduced diameter in bore 31. This ensures secure fastening of plug 20 within bore 31. The screwing means typically may be key holes 23 in the plug head portion 21 for receiving a key, wrench, or the like.

Cover member 2 includes a cap portion 8 and a stem portion 3, which is exteriorly threaded with threads 5, and is receivable in bore 31 of the weight body 30. As illustrated in the drawings, stem portion 3 includes a bore 6 for receiving adjustment particles, bore 6 being interiorly threaded with threads 7. The adjustment particles may be sealed within bore 6 by means of a headless set screw 10 or the like.

For measuring weights on the order of ten pounds or more it is preferable that cover member 2 include means by which a person may grip the weight with two hands. As illustrated in the drawings, this gripping means includes a rod member 4 partially disposed within the cap portion 8 of cover member 2, transverse to the longitudinal axis of cover member 2, portions of rod member 4 projecting from the sides of cap portion 8 to form hand grips. As can be readily appreciated the hand grips formed by rod member 4 facilitate movement of the weight 1. Rod member 4 may be secured to cover member 2 in any known fashion such as by set screw 9 disposed within stem bore 6.

The weight 1 is adjusted to its desired value by a gradual boring of adjustment plug 20. Of course, the weight 1, including all its components, has a weight greater than its desired final value before adjustment plug 20 is bored. The weight 1 may be further adjusted by adding adjustment particles to bore 6 and sealed therein by set screw 10. FIG. 2 illustrates an assembled measuring weight made in accordance with the subject invention which has been completely adjusted. Adjustment plug 20 includes adjusting bore 25, and adjustment particles 11 have been added to and sealed within cover member bore 6.

As indicated above, the measuring weight of the subject invention includes fail-safe features by which inaccuracies caused by improper use are virtually eliminated. More particularly, unlike known measuring weights, which include adjustment particles in the bore of the body weight from where the particles can be easily emptied, the measuring weight of the subject invention includes an adjustment plug which is securely fastened to the bore of the weight body, and which may not be readily tampered with. Should the adjustment plug be removed it may be easily reinserted without a loss in weight accuracy. This feature should be contrasted with known measuring weights in which if the adjustment particles are emptied from the bore of the weight they would be practically impossible to replace by the user. In addition, because the adjustment plug of the subject invention comprises on the order 1% to 5% of the total weight of the measuring weight, its absence may be readily ascertained, thus preventing continuous use of an inaccurate instrument. Also, although adjustments of the subject weight may require addition of adjustment particles, under the subject invention these particles are added to a bore in the cap member and sealed therein. As such they are not apparent to users nor readily accessible thereto, thereby virtually eliminating the possibility that particles may be inadvertently lost and the weight rendered inaccurate. In addition to the above described fail-safe features, the measuring weight of the subject invention includes hand grips which greatly facilitate movement thereof especially when the weights are on the order of 10 pounds or more.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the appended claims are also desired to be protected.

What is claimed is:

1. A weight measuring instrument comprising:
   a body portion having a threaded bore therethrough, said threaded bore including a portion of reduced diameter;
   an adjustment plug, having a head portion and a stem portion, said stem portion being exteriorly threaded and receivable in the portion of reduced diameter in the threaded bore of said body portion, said head portion including means for screwing the stem portion of said adjustment plug into the portion of reduced diameter of the bore of the body portion;
   a cover member having an exteriorly threaded stem portion receivable in the threaded bore of the body portion, said cover member including a threaded bore for receiving adjustment particles, said cover member further including means for sealing said adjustment particles within said cover member bore.

2. A weight measuring instrument as recited in claim 1 in which the means for screwing the stem portion of the adjustment plug into the portion of reduced diameter in the bore of the body portion are holes disposed in the head portion of the adjustment plug for receiving a key.

3. A weight measuring instrument as recited in claim 1 in which the means for sealing the adjustment particles within the bore of the cover member is a set screw.

4. A weight measuring instrument as recited in claim 1 in which the cover member further includes a rod member, integral therewith and partially disposed within said cover member transverse to the longitudinal axis of said cover member, portions of said rod member projecting beyond the sides of said cover member to form hand grips.

5. A weight measuring instrument as recited in claim 1 in which said adjustment plug is on the order of 1% to 5% of the total weight of the instrument.

6. A fail-safe weight measuring instrument comprising:
- a body portion having a threaded bore therethrough, said threaded bore including a portion of reduced diameter;
- an adjustment plug, having a head portion and a stem portion, said stem portion being exteriorly threaded and receivable in the portion of reduced diameter in the threaded bore of the body portion, said head portion including an aperture for receiving a key for screwing said stem portion within the portion of reduced diameter in the threaded bore of the body portion, said adjustment plug being on the order of 1% to 5% of the total weight of the instrument;
- a cover member, having a threaded bore for receiving adjustment particles, said cover member including an exteriorly threaded stem portion receivable in the threaded bore of the body portion, said cover member further including a rod member, integral with and partially disposed within said cover member transverse to the longitudinal axis of said cover member, portions of said rod member projecting from the sides of said cover member to form hand grips.

* * * * *